(12) United States Patent
Sato

(10) Patent No.: US 7,602,426 B2
(45) Date of Patent: Oct. 13, 2009

(54) DIGITAL CAMERA AND DEFECT PIXEL COMPENSATION SYSTEM

(75) Inventor: Yoshihiro Sato, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 438 days.

(21) Appl. No.: 11/491,148

(22) Filed: Jul. 24, 2006

(65) Prior Publication Data

US 2007/0033627 A1  Feb. 8, 2007

(30) Foreign Application Priority Data

Jul. 25, 2005 (JP) ............... 2005-214425

(51) Int. Cl.
*H04N 9/64* (2006.01)
*H04N 5/225* (2006.01)
*H04N 3/14* (2006.01)

(52) U.S. Cl. ............... 348/246; 348/207.1; 348/272

(58) Field of Classification Search ............. 348/207.1, 348/207.11, 246, 247, 272–283
See application file for complete search history.

(56) References Cited

U.S. PATENT DOCUMENTS

| | | | |
|---|---|---|---|
| 6,201,249 B1 * | 3/2001 | Yamayoshi | 250/370.11 |
| 6,381,357 B1 * | 4/2002 | Tan et al. | 382/141 |
| 6,396,539 B1 * | 5/2002 | Heller et al. | 348/246 |
| 6,535,648 B1 * | 3/2003 | Acharya | 382/274 |
| 6,693,668 B1 * | 2/2004 | May et al. | 348/247 |
| 6,819,358 B1 * | 11/2004 | Kagle et al. | 348/246 |
| 7,129,973 B2 * | 10/2006 | Raynor | 348/247 |
| 7,365,783 B2 * | 4/2008 | Hashimoto et al. | 348/246 |
| 2003/0007081 A1 * | 1/2003 | Kwon et al. | 348/247 |

FOREIGN PATENT DOCUMENTS

| | | |
|---|---|---|
| JP | 5-68209 A | 3/1993 |
| JP | 2000-59690 A | 2/2000 |

* cited by examiner

*Primary Examiner*—Nhan T Tran
*Assistant Examiner*—Trung Diep
(74) *Attorney, Agent, or Firm*—Birch, Stewart, Kolasch & Birch, LLP.

(57) ABSTRACT

A digital camera is connected to a computer through a serial terminal. The computer is connected to a server through an internet. To the server, the digital camera transmits uncompensated image data to which no defect pixel compensation is applied, and defect pixel information preliminarily read from a nonvolatile memory. The server analyses this image data to compare with the defect pixel information, and then creates new defect pixel information. The new defect pixel information is transmitted to the digital camera, and additionally written to the nonvolatile memory. The digital camera compensates image data obtained by image capturing, based on the defect pixel information.

14 Claims, 5 Drawing Sheets

DIGITAL CAMERA AND DEFECT PIXEL COMPENSATION SYSTEM

BACKGROUND OF THE INVENTION

1. Field of the Invention

The present invention relates to a digital camera which compensates defect pixels of a solid state imaging device, and a system for compensating defect pixels of a solid state imaging device.

2. Description Related to the Prior Art

In recent years, a digital camera having a solid state imaging device such as a CCD sensor or a CMOS sensor is used. Since such solid state imaging device has at least millions of pixels, it is practically difficult to produce the solid state imaging device with no defect pixel. Accordingly, there is a need to use the solid state imaging device in view of the presence of certain defect pixels.

The defect pixel is a pixel which does not output the signal correctly corresponding to subject brightness. For example, there are a white defect pixel which generates signal (charge) even when the light is not entered and a black defect pixel which does not generate signal (charge) even when the light is entered. The white defect makes a picture pixel brighter, and the black defect makes a picture pixel darker. To prevent a deterioration of image quality caused by the defect pixel, it is already developed a digital camera which compensates the signals of defect pixels by software process.

In digital cameras disclosed in Japanese Patent Laid-Open Publications No. 2000-059690 and No. 05-068209, defect pixels of a solid state imaging device are detected in a production process by a defect inspection machine. Then information of position, kind and degree of the defect of each defect pixel is stored for example in a memory incorporated in the digital camera. Accordingly, output signal of the defect pixel can be compensated by interpolating the output signal of the defect pixels with the output signal of surrounding normal pixels. The solid state imaging devices are expected to have more and more pixels, and therefore the accurate compensation of the defect pixels is essential to increase quality of product.

However, in the digital cameras disclosed in the Japanese Patent Laid-Open Publications No. 2000-059690 and No. 05-068209, although the defect pixels detected at a factory can be compensated, defect pixels newly generated by aging degradation of the solid state device after shipment cannot be compensated.

SUMMARY OF THE INVENTION

An object of the present invention is to provide a digital camera and a defect pixel compensation system which enable to compensate defect pixels generated by aging degradation of a solid state imaging device.

In order to achieve the above object and other objects, a digital camera of the present invention comprises a rewritable nonvolatile memory for storing defect pixel information, a compensation processing section which applies defect pixel compensating process to image data based on the defect pixel information in the nonvolatile memory, a communicating section for transmitting uncompensated image data to a server through an internet and for receiving new defect pixel information from the server, and a defect pixel information recording section which updates the nonvolatile memory with the new defect pixel information. The uncompensated image data is image data to which said defect pixel compensating process is not applied, and the new defect pixel information is obtained on analysis of the uncompensated image data performed by the server.

A defect pixel compensation system of the present invention comprises an imaging apparatus and a server. The imaging apparatus compensates image data of defect pixels with use of defect pixel information. The server analyzes uncompensated image data received from the imaging apparatus to create new defect pixel information and transmitting the new defect pixel information to the imaging apparatus.

According to the present invention, the defect pixel information can be updated at any timing only by the access of the imaging apparatus to the server through the internet. Accordingly, it is possible to compensate the image captured by the solid state imaging device, which includes the defect pixels generated by the aging degradation, without using a tool such as a flash memory writer. Therefore, even if the defect pixels are generated during the lifetime of the solid state imaging device, the image with high quality can be obtained.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
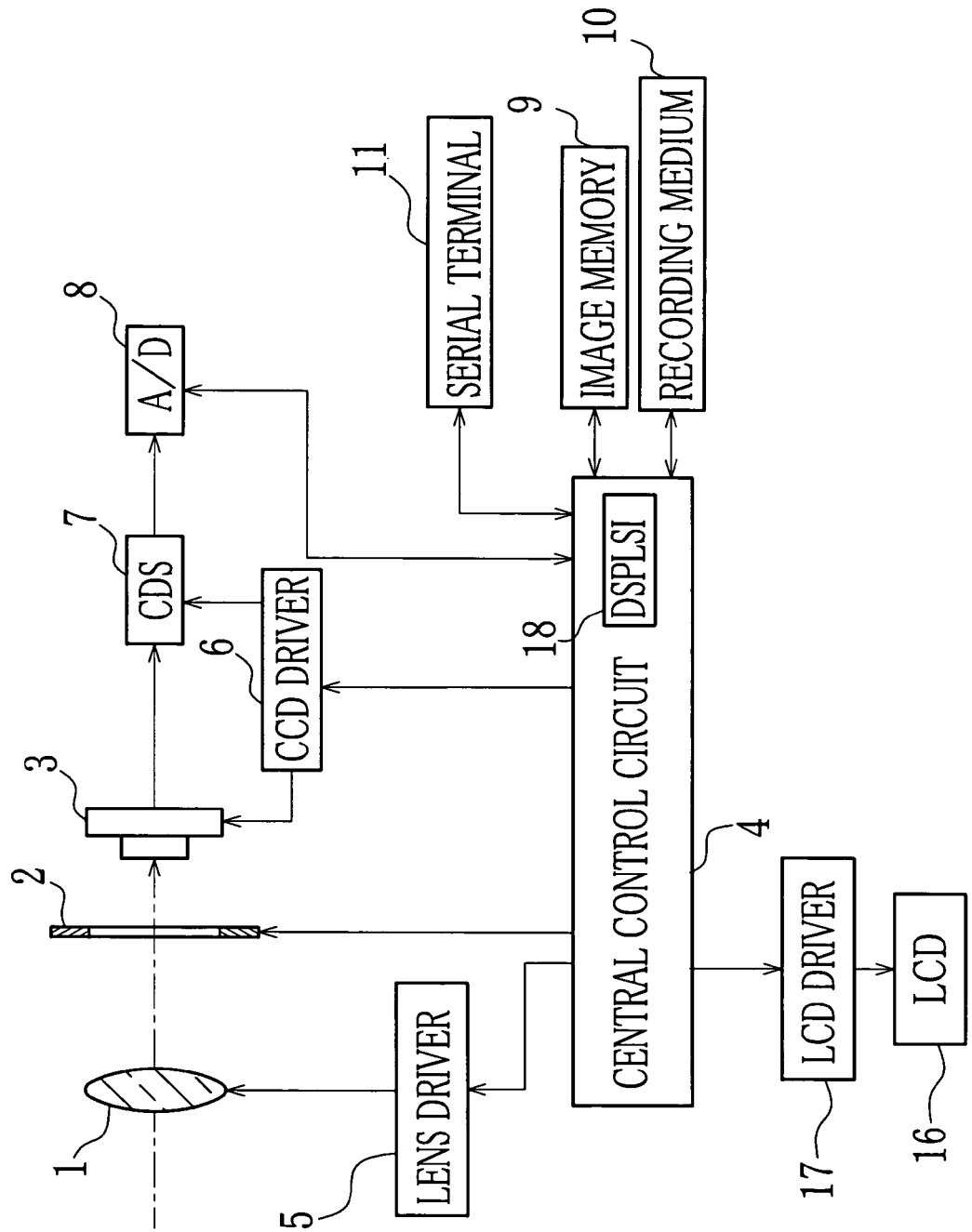
FIG. 1 is a block diagram showing a construction of a digital camera of the present invention.

As shown in FIG. 1, a CCD imaging device 3 is provided behind a taking lens 1 and a mechanical shutter 2. The taking lens 1 is moved toward a focal point by a lens driver 5, which is controlled by a central control circuit 4, and focuses a subject light on the CCD imaging device 3. The mechanical shutter 2 is normally in an open state. It is set in a closed state when exposure time passed after the start of image taking action by release operation of a user. Then it is set in the open state again after the image taking action.

The CCD imaging device 3 has a plurality of pixels and converts an optical image of the subject focused on the pixels into electrical signals. A CCD driver 6 generates transfer pulses and feeds them to the CCD imaging device 3. The CCD imaging device 3 outputs image signals based on the transfer pulses.

To the CCD imaging device 3, a CDS (correlated double sampling) circuit 7 is connected. The CDS 7 is for reducing noises, and is driven by drive pulses outputted from the CCD driver 6. To an output terminal of the CDS 7, an A/D converter 8 is connected. The A/D converter 8 converts the image signal of analog into digital signal (image data) and outputs the image data. The image data of each pixel obtained through the A/D converter 8 is temporarily stored in an image memory 9.

The image data stored in the image memory 9 is subject to various image processes performed by the central control circuit 4 and is finally recorded in a recording medium 10 such as a memory card or a magnetic optical disc. One of the image processes is a process for compensating the image data from the defect pixels of the CCD imaging device 3 (defect pixel compensation process).

In the central control circuit 4, a DSPLSI 18 is provided for performing the defect pixel compensation process. To the central control circuit 4, a serial terminal 11 for accessing a FLASH ROM 34 incorporated in the DSPLSI 18 is connected. In addition, to the central control circuit 4, an LCD driver 17 for driving an LCD 16 is connected.

Figure 2:
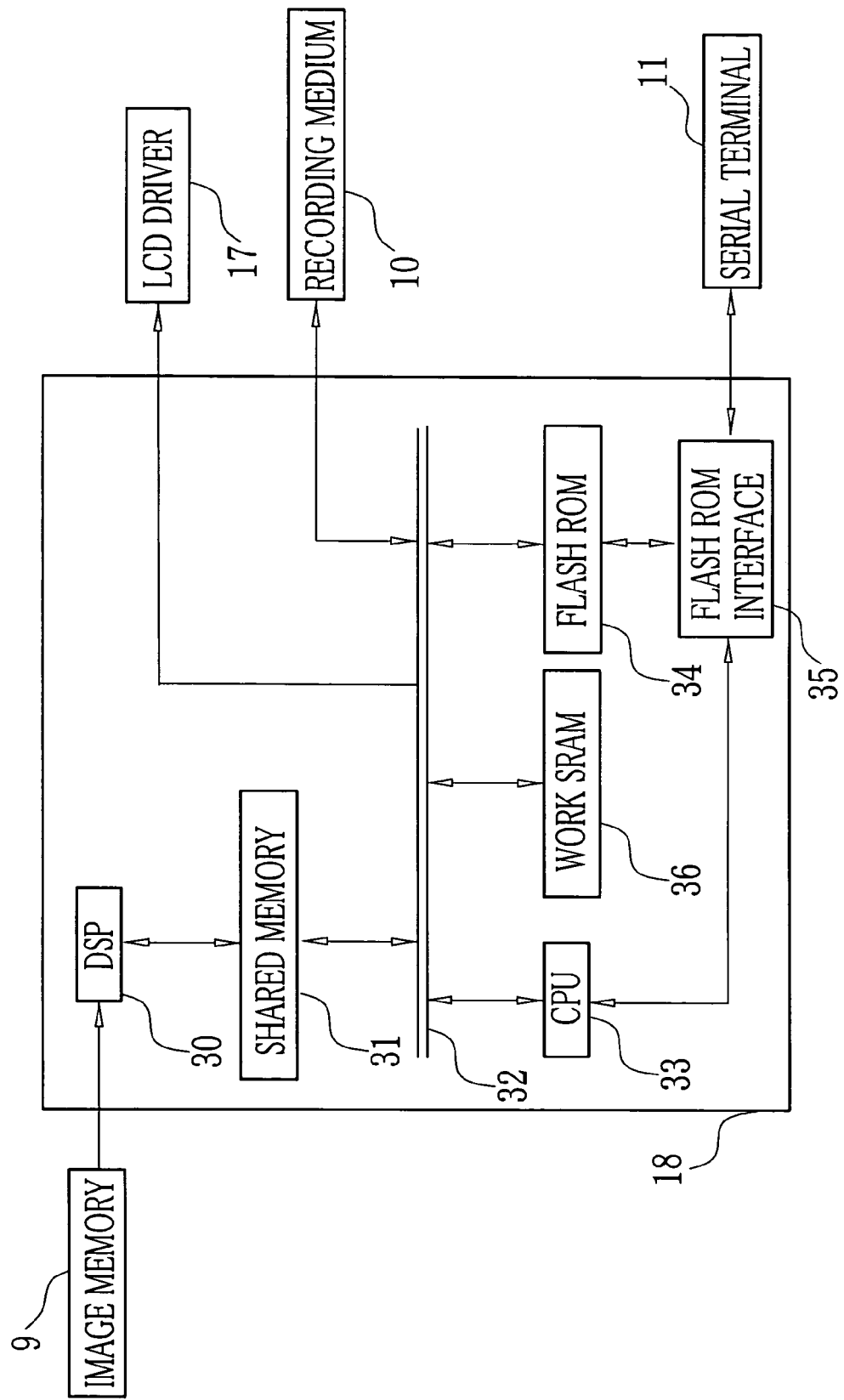
FIG. 2 is a block diagram showing a construction of a DSPLSI in the digital camera.

Next, the DSPLSI 18 will be described in detail with reference to FIG. 2. The DSPLSI 18 comprises a DSP 30 for performing the image processes, a CPU 33 which controls each process and reads/writes data from/to each device (a shared memory 31, a work SRAM 36, the FLASH ROM 34, the LCD driver 17 and the recording medium 10) through a CPU bus 32, the shared memory 31 from/to which both the DSP 30 and the CPU 33 can read/write data, and the work SRAM 36 storing data to be processed by the CPU 33. In addition, the DSPLSI 18 comprises the FLASH ROM 34 which is a nonvolatile memory storing data including a serial number of the CCD imaging device 3 and the defect pixel information showing positions of the defect pixels, and a FLASH ROM interface 35 which is a circuit for communicating with a computer through serial communication to read out data stored in the FLASH ROM 34 and to write data into the FLASH ROM 34.

The defect pixel information and the serial number is written in the FLASH ROM 34 in a production process of a digital camera 40. The defect pixel information is used to determine the positions of the defect pixels, and the serial number is used to authenticate the CCD imaging device 3 when updating of the defect pixel information through the communication with the server 45.

Figure 3:
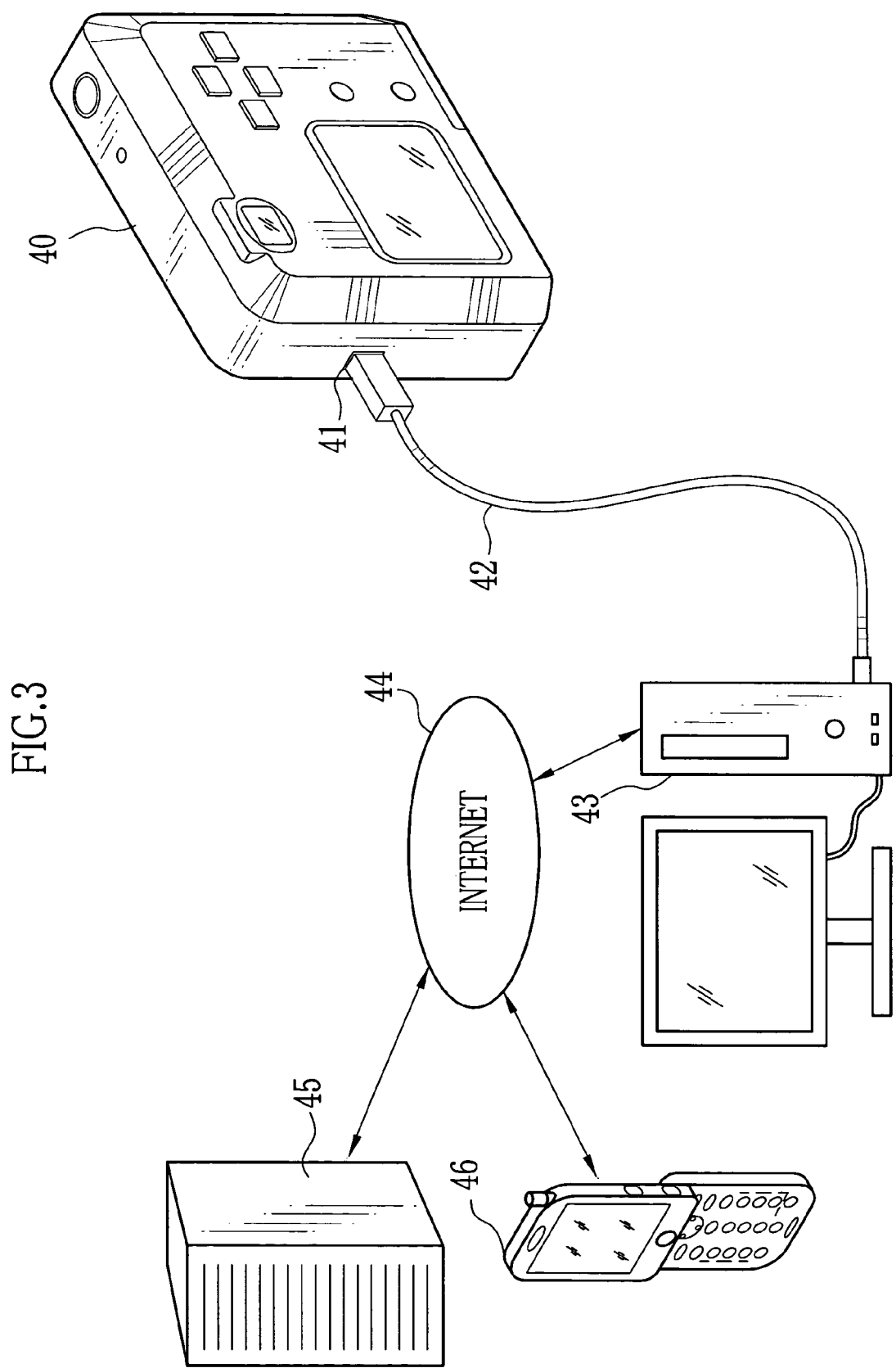
FIG. 3 is a schematic view of a defect pixel compensation system comprised of a server and a digital camera or a camera phone.

Since new defect pixels are generated in the CCD imaging sensor 3 by time deterioration after shipment, the update of the defect pixel information is required. As shown in FIG. 3, the user connects the digital camera 40 to the computer 43 at an appropriate timing to update the defect pixel information from the server 45 through an internet 44.

The FLASH ROM interface 35 outputs the serial number of the CCD imaging device 3, the defect pixel information and image data for a defect pixel analysis to the server 45 through the serial terminal 11 according to control signal from the CPU 33. The image data for the analysis is image data which is read from the recording medium 10 and written in the FLASH ROM 34 by the CPU 33. In addition, the FLASH ROM interface 35 receives an authentication completion notice of the serial number of the CCD imaging device 3 and renewed defect pixel information, from the server 45 through the serial terminal 11. This reception is informed to the CPU 33 by control signal from the CPU 33. When receiving the renewed defect pixel information, the FLASH ROM interface 35 updates the defect pixel information stored in the FLASH ROM 34.

The CPU 33 reads out the defect pixel information, which is used by the DSP 30 for the image compensation, from the FLASH ROM 34 and writes it to the shared memory 31. The DSP 30 performs the defect pixel compensation process to the image data stored in the image memory 9 using the defect pixel information written in the shared memory 31, and writes the compensated image data into the shared memory 31. The defect pixel compensation process may be the interpolation of the output signal from the defect pixels with the output signal from surrounding normal pixels. Then the image data in the shared memory 31 is written in the recording medium 10 by the CPU 33. To reproduce the image, the CPU 33 reads out the image data from the recording medium 10, and outputs the image data to the LCD 16 through the LCD driver 17. Note that in the work SRAM 36, data used by the CPU 33 to perform each process is stored.

For the connection between the digital camera 40 and the computer 43, one end terminal of a serial cable 42 is connected to the serial terminal 41 of the digital camera 40, and the other end terminal of the serial cable 42 is connected to a serial terminal of the computer 43. The computer 43 accesses the internet 44 for communicating with the server 45. The computer 43 stores a software for mutually converting the serial communication between the computer 43 and the digital camera 40 and the internet communication between the computer 43 and the server 45.

Figure 4:
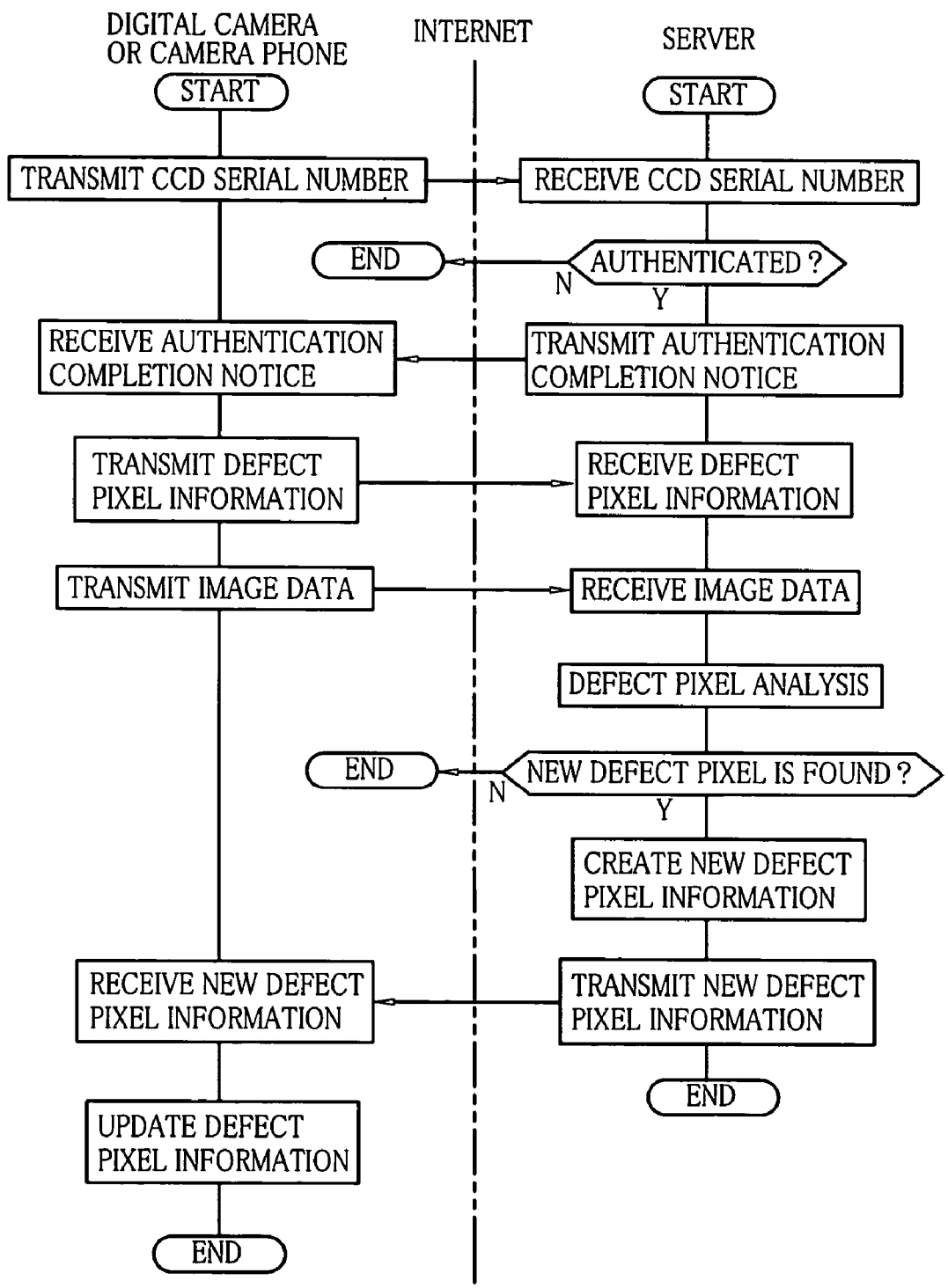
FIG. 4 is a flowchart showing updating processes for defect pixel information based on the defect pixel information memorized in the digital camera or the camera phone.

With reference to FIG. 4, the operation of the server 45 and the digital camera 40 for updating the defect pixel information will be described. In the updating, at first the CCD serial number stored in the FLASH ROM 34 is transmitted to the server 45. The server 45 performs authentication of the CCD serial number, to determine whether the CCD imaging device 3 is the authenticated product or not. When the CCD serial number is not authenticated, the updating is stopped. When the CCD serial number is authenticated, the server 45 transmits the authentication completion notice to the digital camera 40. The digital camera 40 transmits the defect pixel information and the image data for the defect pixel analysis stored in the FLASH ROM 34 to the server 45 after receiving the authentication completion notice. The image data for defect pixels is image data previously captured by the user, to which the defect pixel compensation process is not applied.

The server 45 analyzes this image data to compare with the defect pixel information, and determines positions of defect pixels newly generated by the aging degradation. When there is no new defect pixel, the server 45 stops the updating. When there are new defect pixels, the server 45 creates the new defect pixel information by adding the positions of the new defect pixels to the received defect pixel information, and transmits the new defect pixel information to the digital camera 40. The digital camera 40 receives the new defect pixel information, and updates the defect pixel information stored in the FLASH ROM 34.

Figure 5:
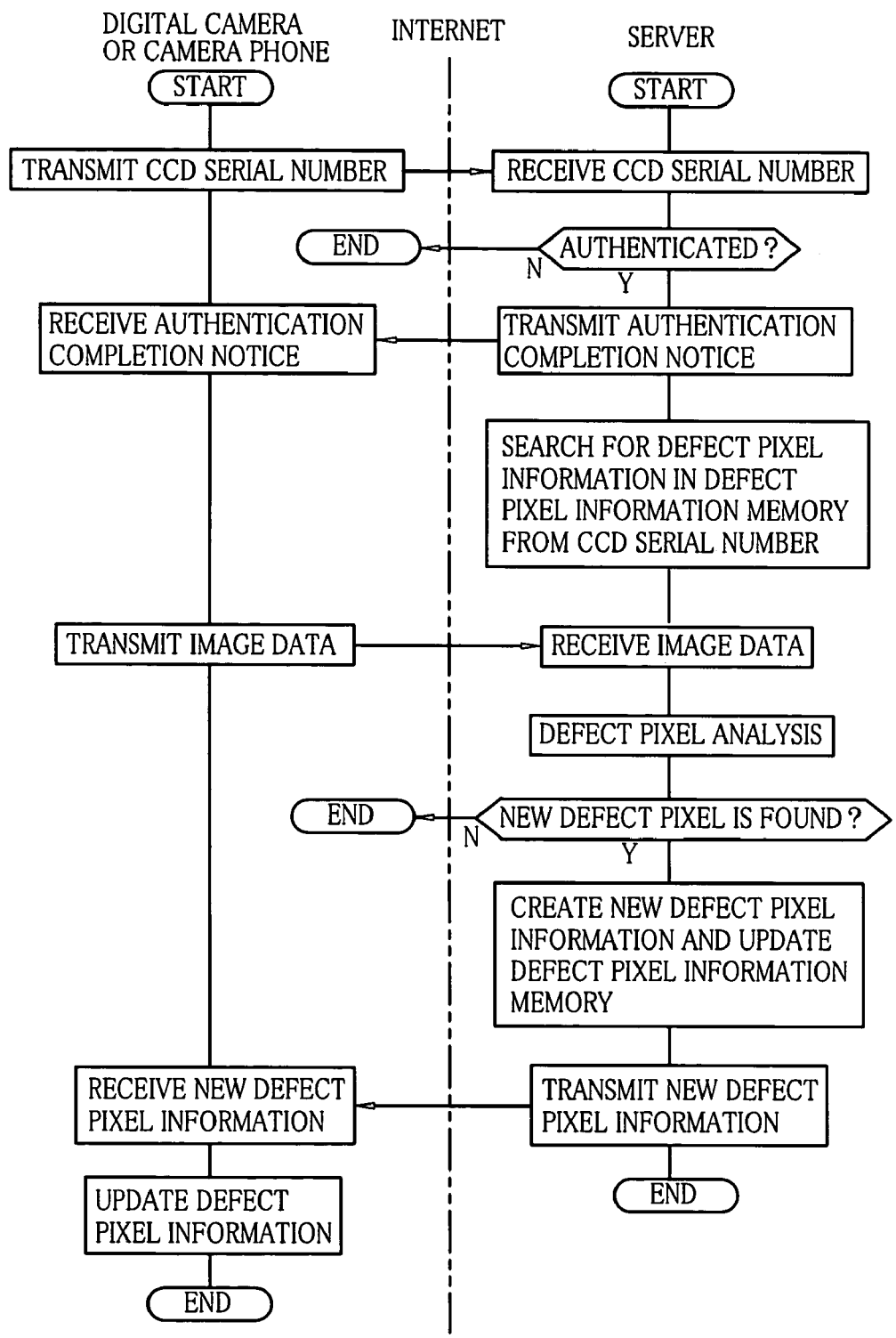
FIG. 5 is a flowchart showing updating processes for defect pixel information based on the defect pixel information memorized in the server.

In the above embodiment, the defect pixel information is stored in the digital camera and transmitted to the server from the digital camera. However, the defect pixel information may be stored in a memory of the server preliminarily. In this case, as shown in a flowchart of FIG. 5, the defect pixel information is obtained from a defect pixel information memory provided in the server. The defect pixel information memory has plural storing regions respectively assigned to each of the CCD serial numbers, and the defect pixel information determined in the production process is stored in the corresponding storing region. After completing the receive of the CCD serial number from the digital camera and the authentication of the CCD serial number, the server searches the storing regions of the defect pixel information memory to obtain the defect pixel information corresponding to the CCD serial number. Then the server analyzes image data received from the digital camera to compare with the defect pixel information, and determines positions of defect pixels newly generated. When there is no new defect pixel, the server stops the updating. When there are new defect pixels, the server creates the new defect pixel information by adding the positions of the new defect pixels to the defect pixel information memory, and transmits the new defect pixel information to the digital camera.

In the above embodiment, the digital camera 40 is used in the defect pixel compensation system. However, a camera phone 46 also may be used in this system. In this case, the camera phone 46 communicates with the server 45 through a wireless communication function incorporated in the camera phone, to perform the processes shown in FIG. 4 and FIG. 5. Accordingly, the updating of the defect pixel information can be performed as same as the system with the digital camera 40. In addition, although the CCD imaging device is used in the above embodiment, a CMOS imaging device also may be used.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera, which includes a solid state imaging device having a plurality of pixels for photoelectrically converting a subject image to obtain image data of said subject image, comprising:
    a rewritable nonvolatile memory for storing defect pixel information about defect pixels;
    a compensation processing section which applies defect pixel compensating process to said image data based on said defect pixel information stored in said nonvolatile memory;
    a communicating section for transmitting uncompensated image data to a server through an internet and for receiving new defect pixel information from said server, said uncompensated image data being image data to which said defect pixel compensating process is not applied, and said new defect pixel information being obtained by analysis of said uncompensated image data performed by said server; and
    a defect pixel information recording section which updates said nonvolatile memory with said new defect pixel information.

2. A digital camera claimed in claim 1, wherein said communicating section transmits said defect pixel information with said uncompensated image data to said server.

3. A digital camera claimed in claim 1, wherein said communicating section transmits unique identification information of said solid state imaging device with said uncompensated image data to said server.

4. A digital camera claimed in claim 1, wherein said communicating section has a serial terminal for serial communication with an external computer, said external computer accessing said internet for internet communication with said server.

5. A defect pixel compensation system comprising:
    an imaging apparatus including:
        a solid state imaging device having a plurality of pixels for photoelectrically converting a subject image;
        a rewritable nonvolatile memory for storing defect pixel information about defect pixels; and
        a compensation processing section which applies defect pixel compensating process to said image data based on said defect pixel information stored in said nonvolatile memory, and
    a server for analyzing uncompensated image data received from said imaging apparatus to create new defect pixel information and transmitting said new defect pixel information to said imaging apparatus, said uncompensated image data being image data to which said defect pixel compensating process is not applied.

6. A defect pixel compensation system claimed in claim 5, wherein said imaging apparatus comprises:
    a communicating section for transmitting said uncompensated image data to said server through an internet and for receiving said new defect pixel information from said server; and
    a defect pixel information recording section which updates said nonvolatile memory with said new defect pixel information.

7. A defect pixel compensation system claimed in claim 6, wherein said server analyzes said uncompensated image data to compare with said defect pixel information, said server creating said new defect pixel information by adding positions of said new defect pixels to said defect pixel information when detecting new defect pixels generated by aging degradation.

8. A defect pixel compensation system claimed in claim 6, wherein said server has a defect pixel information memory for preliminarily storing said defect pixel information and analyzes said uncompensated image data to compare with said defect pixel information in said defect pixel information memory, said server creating said new defect pixel information by adding positions of said new defect pixels to said defect pixel information memory when detecting new defect pixels generated by aging degradation.

9. A defect pixel compensation system claimed in claim 8, wherein said defect pixel information memory has plural recording regions each of which contains said defect pixel information and unique identification information of a solid state imaging device incorporated in each of imaging apparatuses, said imaging apparatus transmitting said identification information with said uncompensated image data to said server, said server creating said new defect pixel information by adding positions of said new defect pixels to said recording region designated by said identification information.

10. A defect pixel compensation system claimed in claim 6, wherein said communicating section has a serial terminal for performing serial communication with an external computer, said external computer accessing said internet for performing internet communication with said server.

11. A defect pixel compensation system claimed in claim 6, wherein said communicating section has a wireless communication function and wirelessly accesses said internet for performing internet communication with said server.

12. A defect pixel compensation method for an imaging device comprising:
    storing information about defective pixels in nonvolatile memory;
    photoelectrically converting a subject image by a solid state imaging device having a plurality of pixels;
    transmitting uncompensated image data, the stored defect pixel information and unique identification information of the solid state imaging device to a server, the uncompensated image data being image data to which a defect pixel compensating process is not applied;
    receiving new defect pixel information from the server, the new defect pixel information being obtained by analysis of the uncompensated image data performed by the server; and
    updating the nonvolatile memory with the new defect pixel information; and applying a defect pixel compensating process to the image data based on the defect pixel information stored in the nonvolatile memory.

13. A defect pixel compensating method for a server comprising:

receiving uncompensated image data, defect pixel information and unique identification information of a solid state imaging device from an imaging device, the uncompensated image data being image data to which a defect pixel compensating process is not applied;

performing authentication of the unique identification information of the solid state imaging device to determine whether or not the solid state imaging device is an authentic product;

analyzing uncompensated image data to compare with the defect pixel information to create new defect pixel information; and transmitting the new defect pixel information to the imaging device.

14. A defect pixel compensation method claimed in claim 13, wherein the server has a defect pixel information memory for preliminarily storing the defect pixel information and analyzes the uncompensated image data to compare with the defect pixel information in the defect pixel information memory, the server creating the new defect pixel information by adding positions of the new defect pixels to the defect pixel information memory when detecting new defect pixels generated by aging degradation.

\* \* \* \* \*